(12) United States Patent
Anderson et al.

(10) Patent No.: US 11,811,349 B2
(45) Date of Patent: Nov. 7, 2023

(54) METHOD AND SYSTEM FOR REGULATING ELECTRIC DRIVE SYSTEM ACCORDING TO PREDICTED TEMPERATURE OF INVERTER CURRENT SENSOR TO PREVENT OVERHEATING

(71) Applicant: Ford Global Technologies, LLC, Dearborn, MI (US)

(72) Inventors: Monty J. Anderson, Boise, ID (US); W. Robert Brown, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 493 days.

(21) Appl. No.: 17/130,513

(22) Filed: Dec. 22, 2020

(65) Prior Publication Data
US 2022/0200512 A1   Jun. 23, 2022

(51) Int. Cl.
   *H02P 29/68*    (2016.01)
   *B60L 50/51*    (2019.01)
   *H02P 27/06*    (2006.01)

(52) U.S. Cl.
   CPC .............. *H02P 29/68* (2016.02); *B60L 50/51* (2019.02); *H02P 27/06* (2013.01); *B60L 2210/40* (2013.01); *B60L 2240/425* (2013.01)

(58) Field of Classification Search
   CPC .......... H02P 29/68; H02P 27/06; B60L 50/51; B60L 2210/40; B60L 2240/425; B60R 16/02
   See application file for complete search history.

(56) References Cited

U.S. PATENT DOCUMENTS

| | | | |
|---|---|---|---|
| 2006/0178852 A1 | 8/2006 | Johns et al. | |
| 2009/0052210 A1 | 2/2009 | Ward et al. | |
| 2009/0063070 A1 | 3/2009 | Renneberg | |
| 2013/0110334 A1* | 5/2013 | Asami | B60L 50/51 701/22 |
| 2013/0127383 A1* | 5/2013 | Kawamura | H02P 21/36 318/400.09 |
| 2015/0256105 A1* | 9/2015 | Kano | B60L 15/2009 363/131 |
| 2017/0217313 A1* | 8/2017 | Hashimoto | H02J 1/082 |
| 2019/0106002 A1* | 4/2019 | Götz | B60L 50/60 |
| 2021/0354593 A1* | 11/2021 | Wang | B60L 58/27 |
| 2021/0359348 A1* | 11/2021 | Zheng | B60L 58/27 |
| 2022/0018720 A1* | 1/2022 | Tulane | G01K 7/22 |

* cited by examiner

*Primary Examiner* — Mussa A Shaawat
(74) *Attorney, Agent, or Firm* — David B. Kelley; Brooks Kushman P.C.

(57) ABSTRACT

An electric drive system includes a controller and an inverter having a switch and a current sensor. The controller reduces power output of the inverter while a sensed temperature of the switch, a sensed current from the inverter, and parameter values of the current sensor are indicative of a predicted temperature of the current sensor being greater than a threshold to maintain inverter temperature lower than the threshold. The parameter values are obtainable from a thermal model of the current sensor. The thermal model is derived from testing a test version of the inverter under different drive cycles in which for each drive cycle a set of information is recorded including a sensed temperature of a switch of the inverter test version, a sensed current output from the inverter test version, and a sensed temperature of a current sensor of the inverter test version.

18 Claims, 5 Drawing Sheets

METHOD AND SYSTEM FOR REGULATING ELECTRIC DRIVE SYSTEM ACCORDING TO PREDICTED TEMPERATURE OF INVERTER CURRENT SENSOR TO PREVENT OVERHEATING

TECHNICAL FIELD

The present invention relates to controlling an inverter of an electric drive system according to a predicted temperature of a current sensor of the inverter to thereby prevent overheating of components of the inverter.

BACKGROUND

An electric drive system includes a battery, an inverter, and a motor. The inverter converts electrical power input from the battery into a desired electrical power to output to the motor.

Components of the inverter are to be protected from excessive temperature caused by the operation of the inverter. The inverter components may be protected from excessive temperature by limiting the time during which the inverter operates at relatively high output power levels. This protection strategy can sometimes de-rate the electric drive system even when the inverter components are not in danger of overheating.

SUMMARY

An electric drive system includes an inverter and a controller. The inverter has a switch and a current sensor. The controller is configured to reduce power output of the inverter while a sensed temperature of the switch, a sensed current output from the inverter, and parameter values of the current sensor are indicative of a predicted temperature of the current sensor being greater than a threshold to maintain inverter temperature lower than the threshold.

The temperature of the switch may be sensed by a temperature sensor (e.g., thermistor) incorporated with the switch, wherein the controller is in communication with the temperature sensor. The current output from the inverter may be sensed using the current sensor, wherein the controller is in communication with the current sensor.

The parameter values of the current sensor are obtainable from a thermal model of the current sensor.

In an embodiment, the thermal model of the current sensor is derived from testing a test version of the inverter under a plurality of drive cycles in which for each drive cycle a set of information is recorded including a sensed temperature of a switch of the test version of the inverter, a sensed current output from the test version of the inverter, and a sensed temperature of a current sensor of the test version of the inverter.

In this embodiment, the parameter values are obtained from the thermal model of the current sensor by finding which values of a current sensor temperature thermal equation having variables of switch temperature, current output, and the parameters fit the set of information recorded for at least one of the drive cycles.

The controller may be further configured to control the switch to cause the current output from the inverter to be commensurate with a commanded current. The electric drive system may further include a battery and a motor. The inverter may be further configured to convert an input electrical power from the battery into an output electrical power based on the commanded current and provide the output electrical power to the motor. The electric drive system may further include a DC link capacitor disposed between the battery and the inverter. The controller may be further configured to de-rate operation of the DC link capacitor to reduce power output of the inverter.

The electric drive system may be of an electric vehicle and further include a traction battery and a motor. In this case, the inverter may be further configured to convert an input electrical power from the traction battery into an output electrical power and provide the output electrical power to the motor for propelling the electric vehicle.

An electric vehicle includes an electric drive system and a controller. The electric drive system includes a traction battery, an inverter having a switch and a current sensor, and a motor. The inverter is configured to convert an input electrical power from the traction battery into an output electrical power and provide the output electrical power to the motor for propelling the electric vehicle. The controller is configured to predict a temperature of the current sensor using a sensed temperature of the switch, a sensed current of the output electrical power from the inverter to the motor, and parameter values obtained from a thermal model of the current sensor. The controller is further configured to de-rate the electric drive system while the predicted temperature is greater than a temperature threshold to prevent overheating.

A method for an electric drive system including an inverter having a switch and a current sensor includes sensing a temperature of the switch and sensing, using the current sensor, a current output from the inverter. The method further includes reducing power output of the inverter while the sensed temperature of the switch, the sensed current output from the inverter, and parameter values of the current sensor are indicative of a predicted temperature of the current sensor being greater than a threshold to maintain inverter temperature lower than the threshold. The parameter values of the current sensor are obtainable from a thermal model of the current sensor.

As described herein, the temperature of current sensors in a production inverter should not exceed a critical temperature threshold. Furthermore, it is often economically desirable to not have hardware dedicated to measuring the temperature of the current sensors.

In accordance with embodiments of the present invention, the temperature of a current sensor in a production inverter can be well estimated using: (i) a thermal model of the current sensors ("current sensor thermal model") containing relatively few constant parameters; (ii) the temperature of the inverter switches (in embodiments, the switches are insulated gate bipolar transistors (IGBTs) and have at least one temperature sensor embedded into the switch hardware); and (iii) the AC output current of the inverter (which is sensed by the current sensors).

The parameters of the current sensor thermal model are determined by using one or more "test" inverters which have been instrumented with additional thermal sensors, including direct measurement of the current sensor temperature (e.g., thermocouples), for the purpose of calibration work. The instrumented inverter is driven through a plurality of cycles that cause the current sensors to operate near their capability limits (typically high current cycles (e.g., repeated hard accelerations, trailer tow, steep climbs, etc.)). The parameters of the current sensor thermal model are then found via a best fit relationship between current sensor temperature, switch temperature, and AC output current. The parameters of the current sensor thermal model could also be estimated from complex CAE thermal models of the inverter.

In a production inverter, the current sensor temperature is estimated (i.e., predicted) and repeatedly updated by the controller of the inverter system. This estimate is provided to other control software responsible for inverter hardware protection and compared against the current sensor temperature limit threshold. If necessary, action can then be taken to prevent the current sensors from overheating (e.g., temporarily de-rating the current capability of the inverter).

The current sensor thermal model is superior to alternative strategies for current sensor hardware protection including: (a) directly measuring the temperature of the current sensors in production inverters—this would increase hardware complexity and cost; and (b) protecting the current sensors from excess temperature by preventing the inverter from exceeding average current vs. time thresholds—this approach is based on worst case thermal conditions and can be overly conservative, causing the inverter to de-rate even when the current sensor is well below its temperature threshold (e.g., unnecessary reduction in vehicle performance).

In exemplary embodiments described and illustrated herein, the inverter is part of an electric vehicle. However, in accordance with the present invention, the inverter is applicable more broadly to any inverter system (including applications other than vehicle applications) where the current sensors of the inverter require thermal protection, but dedicated hardware is undesirable and time-based current limits are too conservative.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
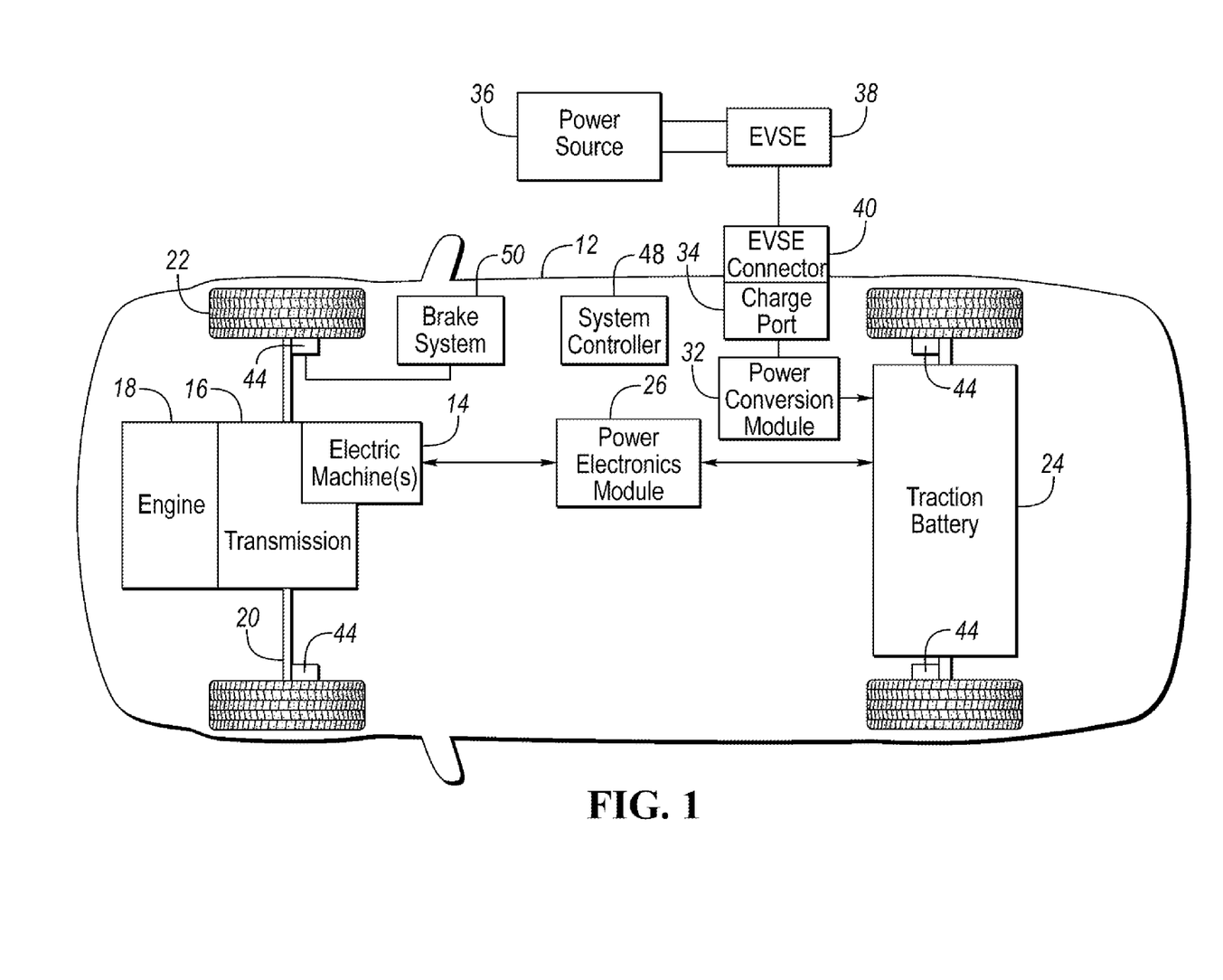
FIG. 1 illustrates a block diagram of an electric vehicle.

Referring now to FIG. 1, a block diagram of an exemplary electric vehicle ("EV") 12 is shown. In this example, EV 12 is a plug-in hybrid electric vehicle (PHEV). EV 12 includes one or more electric machines 14 ("e-machines") mechanically connected to a transmission 16. Electric machine 14 is capable of operating as a motor and as a generator. Transmission 16 is mechanically connected to an engine 18 and to a drive shaft 20 that is mechanically connected to wheels 22. Electric machine 14 can provide propulsion and deceleration capability while engine 18 is turned on or off. Electric machine 14 acting as a generator can recover energy that would normally be lost as heat in a friction braking system. Electric machine 14 may reduce vehicle emissions by allowing engine 18 to operate at more efficient speeds and allowing EV 12 to be operated in electric mode with engine 18 off under certain conditions.

A traction battery 24 ("battery") stores energy that can be used by electric machine 14 for propelling EV 12. Battery 24 typically provides a high-voltage direct current (DC) output. Battery 24 is electrically connected to a power electronics module 26. Power electronics module 26 is electrically connected to electric machine 14 and provides the ability to bi-directionally transfer energy between battery 24 and the electric machine. For example, battery 24 may provide a DC voltage while electric machine 14 may require a three-phase alternating current (AC) current to function. Power electronics module 26 may convert the DC voltage to a three-phase AC current to operate electric machine 14. In a regenerative mode, power electronics module 26 may convert three-phase AC current from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to regulate and manage the transfer of energy between external power source 36 and EV 12. External power source 36 may provide DC or AC electric power to EVSE 38. EVSE 38 may have a charge connector 40 for plugging into a charge port 34 of EV 12. Charge port 34 may be any type of port configured to transfer power from EVSE 38 to EV 12. Charge port 34 may be electrically connected to an on-board power conversion module 32 of EV 12. Power conversion module 32 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for decelerating and preventing motion of EV 12. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers can be microprocessor-based devices. The controllers may communicate via a serial bus (e.g., Controller Area Network (CAN)) or via discrete conductors. For example, a system controller 48 (i.e., a vehicle controller) is present to coordinate the operation of the various components.

As described, EV 12 is in this example is a PHEV having engine 18 and battery 24. In other embodiments, EV 12 is a battery electric vehicle (BEV). In a BEV configuration, EV 12 does not include an engine.

Figure 2:
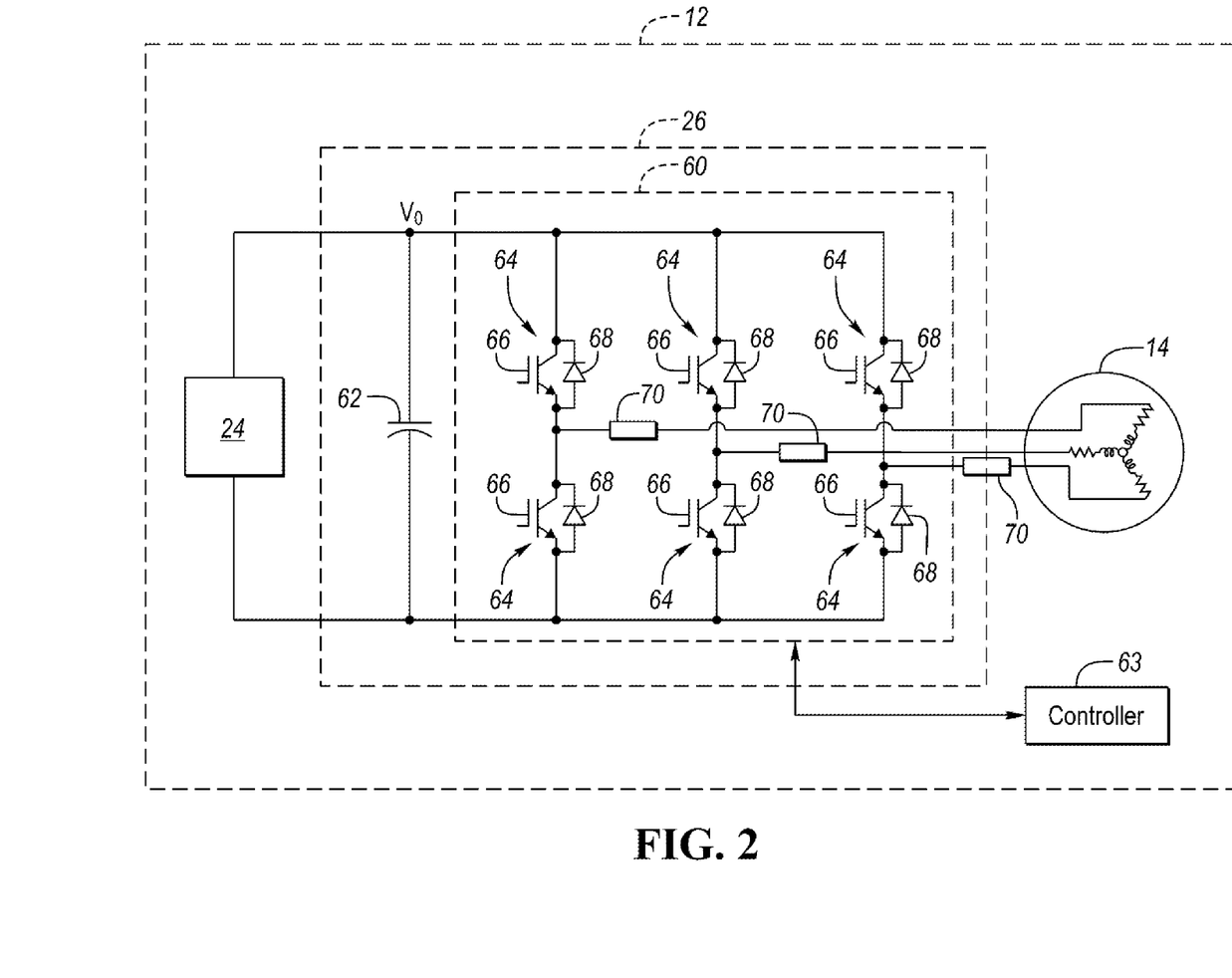
FIG. 2 illustrates a schematic diagram of components of an electric drive system of the electric vehicle, the components including an inverter and a motor of the electric drive system.
Figure 3:
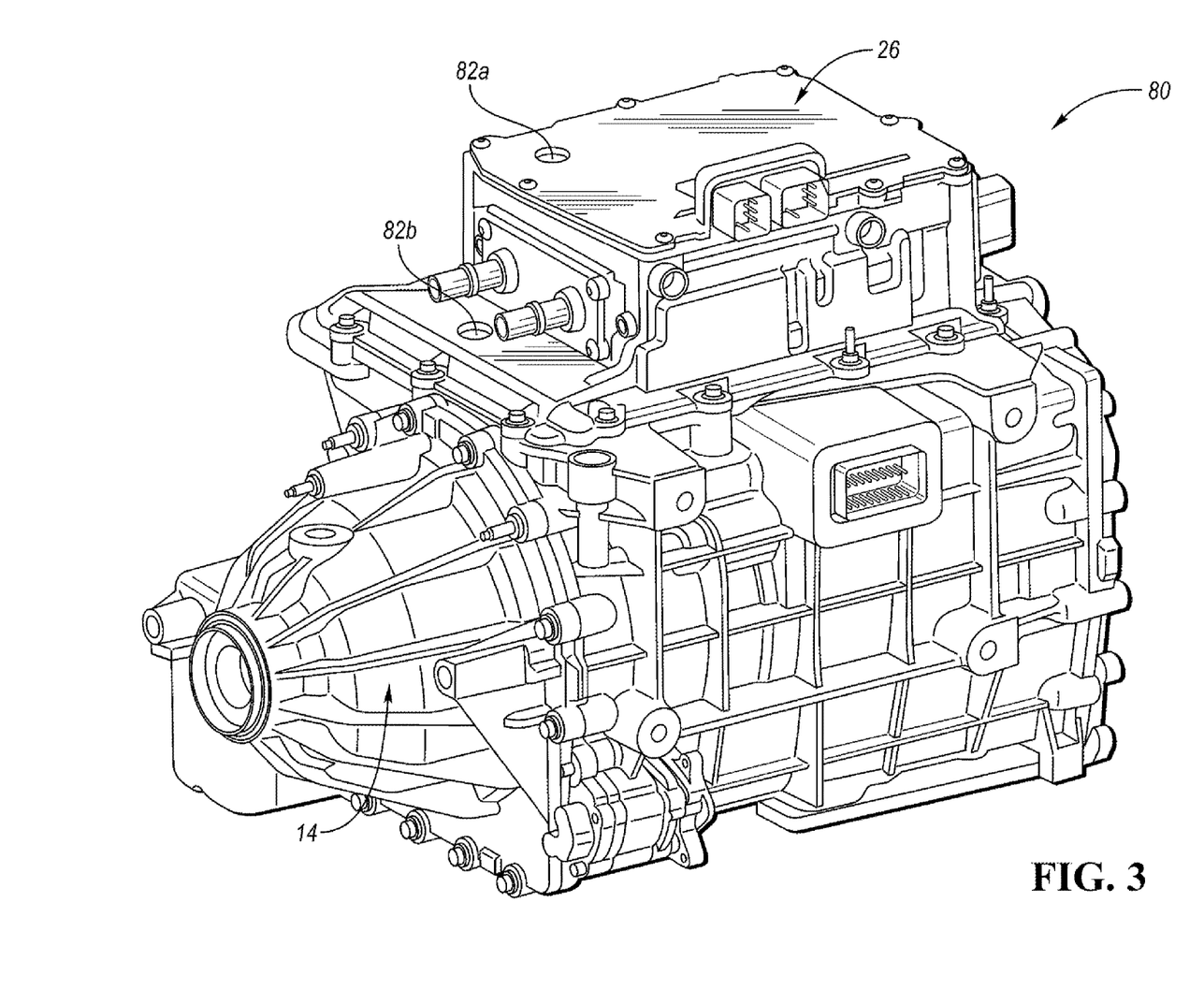
FIG. 3 illustrates a perspective view of a test version of an eDrive unit of the electric drive system of the electric vehicle, the eDrive unit including the inverter and the motor of the electric drive system.

Referring now to FIG. 2, with continual reference to FIG. 1, a schematic diagram of components of an electric drive system of EV 12 is shown. As shown in FIG. 2, the electric drive system includes traction battery 24, power electronics module 26, and electric machine (i.e., "motor") 14. Power electronics module 26 and motor 14 may be assembled together and thereby form an "eDrive" unit of the electric drive system, such as shown in FIG. 3.

As described above, power electronics module 26 is coupled between battery 24 and motor 14. Power electronics module 26 converts DC electrical power provided from battery 24 into AC electrical power for providing to motor 14. In this way, power electronics module 26 drives motor 14 with power from battery 24 for the motor to propel EV 12.

Power electronics module 26 includes an inverter (or "inverter control system" ("ICS")) 60 and a DC link capacitor 62. Inverter 60, shown in FIG. 2, is an exemplary inverter. DC link capacitor 62 is disposed between battery 24 and inverter 60 and is connected in parallel with battery 24. DC link capacitor 62 is operable to absorb ripple currents generated at battery 24 and stabilize a DC-link voltage Vo for inverter 60 control.

As known to those of ordinary skill, inverters convert DC power to multi-phase AC power (three-phase being the most common). Inverters can move power in either direction (bi-directional) either driving an electric machine (i.e., motoring) or electrically braking the electric machine (i.e., generating). Any inverter system is made up of a combination of power electronic hardware (switches) and control software (FIG. 2 is a representative drawing). Electrical current can be quickly adjusted by opening and closing the switches in the inverter.

Many inverter systems, including inverters relevant to embodiments of the present invention such as inverter 60, perform closed loop current control to precisely control the e-machine. To achieve this, the current in each phase of the inverter is sensed with a current sensor and a corresponding signal is provided to the controller of the inverter system. The current sensors can use and/or be implemented in a different technologies and current sensors 70 shown in FIG. 2, discussed below, are but one example. Such current sensors are typically integrated into the inverter.

Inverter 60 includes inverting circuitry and heat generating components such as a plurality of switching units 64. As known to those of ordinary skill, in the exemplary example, inverter 60 includes three sets of pairs of switching units 64 (i.e., three×two=a total of six switching units 64 as shown in FIG. 2). Each set pair of switching units 64 includes two switching units 64 connected in series. Each switching unit 64 includes a switch 66, in the form a transistor, arranged anti-parallel with a diode 68. In this example, the transistor is an insulated gate bipolar transistor (IGBT). Each set pair of switching units 64 is connected in parallel with battery 24 and DC link capacitor 62 and thereby each set pair of switching units forms a "phase" of inverter 60. In this way, inverter 60, having three set pairs of switching units 64, is a three-phase inverter operable for converting DC electrical power from battery 24 into three-phase AC electrical power for providing to motor 14.

Further, each phase of inverter 60 includes a current sensor 70. For instance, each current sensor 70 is a resistive shunt connected in series with the output of the corresponding phase. Current sensors 70 are operable for sensing the electrical current outputted from the corresponding phases of inverter 60 to motor 14.

Inverter 60 has an associated controller 63. Controller 63 can be a microprocessor-based device. Controller 63 is configured to control and monitor operation of inverter 60. Particularly, controller 63 is operable to control the operation of switches 66 to cause inverter 60 to convert a given DC electrical power provided from battery 24 into a desired AC electrical power for providing to motor 14.

Controller 63 is in communication with current sensors 70 to monitor the AC electrical power provided from inverter 60 to motor 14. Controller 63 uses information of current sensors 70 as feedback in controlling inverter 60 to output the desired AC electrical power to motor 14.

Switches 66 are associated with temperature sensors (e.g., thermistors) (not shown) which directly measure the temperature of the switches. Controller 63 is in communication with these temperature sensors to monitor the temperatures of switches 66. Controller 63 may control the operation of inverter 60 according to the monitored temperatures of switches 66 to prevent overheating.

Notably, the temperatures of DC link capacitor 62 and current sensors 70 are not directly measurable. DC link capacitor 62 and current sensors 70 are also components of inverter 60 which are to be protected from excessive temperature caused by the operation of the inverter in converting the input power to the output power. In accordance with embodiments, a current sensor thermal model (i.e., a temperature schedule) is generated for use in a protection strategy such that the capability of the electric drive system is not unnecessarily limited as the case may be with the protection strategy of limiting the time during which the inverter operates at relatively high power (e.g., AC $I_{RMS}$) output levels. Accordingly, use of the current sensor thermal model is intended to enable the electric drive system to be de-rated only when the components (e.g., current sensors 70) of inverter 60 are in danger of overheating.

Referring now to FIG. 3, with continual reference to FIGS. 1 and 2, a perspective view of a test version 80 of the eDrive unit of the electric drive system of EV 12 is shown. eDrive unit test version 80 includes power electronics module 26 and motor 14 assembled together. For testing eDrive unit test version 80, pass-through holes 82a, 82b are provided for receiving thermocouples. Thermocouples are placed on current sensors 70 of inverter 60 of power electronics module 26. A thermocouple is placed on DC link capacitor 62 of power electronics module 26. Thermocouples are also placed on the coolant (e.g., glycol) inlet and outlet associated with power electronics module 26. The thermocouples are operable for directly measuring the temperature of the components on which the thermocouples are placed. With the various thermocouples in place, eDrive unit test version 80 is run under a number of different high-current drive cycles with the temperatures of the components being recorded.

Figure 4:
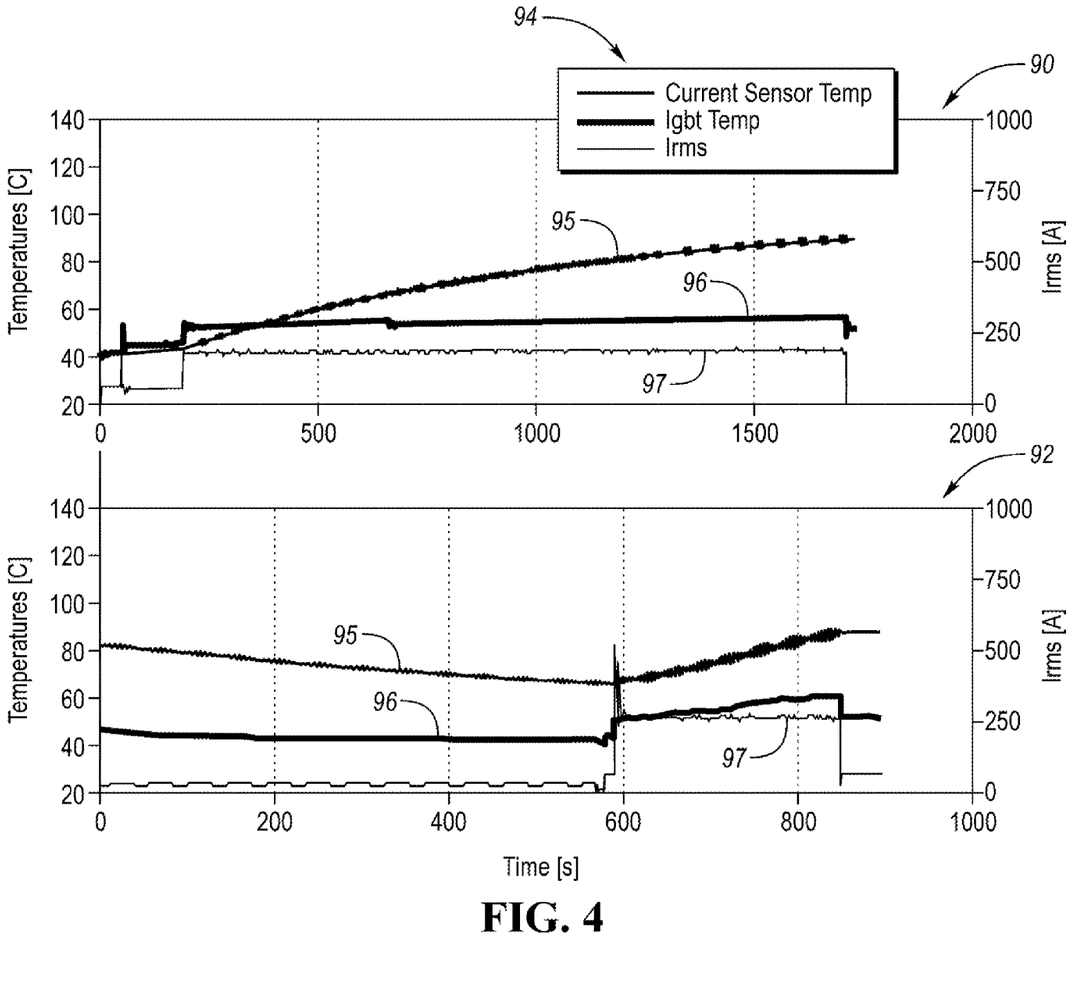
FIG. 4 illustrates a first graph of plotted information generated from testing the eDrive unit test version with a first high-current drive cycle, a second graph of plotted information generated from testing the eDrive unit test version with a different second high-current drive cycle, and a legend providing labeling for the plotted information.

FIG. 4 illustrates a first graph 90 of plotted information generated from testing eDrive unit test version 80 with a first one of the high-current drive cycles, a second graph 92 of plotted information generated from testing the eDrive unit test version with a different second one of the high-current drive cycles, and a legend 94 providing labeling for the plotted information. Of course, eDrive unit test version 80 may be tested with many other high-current drive cycles and/or may be retested with any of the high-current drive cycles. As such, any number of graphs could be generated from testing eDrive test unit version 80. First and second graphs 90 and 92, which pertain to the test results from testing eDrive unit test version 80 with respective first and second different high-current drive cycles, are simply provided in FIG. 4 as being representative of the testing of eDrive unit test version 80 with high-current drive cycles for an example for understanding the process for generating the current sensor thermal model.

The plotted information of graphs 90 and 92, and as labeled in legend 94, includes: a plot 95 of the temperature of a current sensor 70 of inverter 60 as recorded while eDrive unit test version 80 is being run, wherein this current sensor is preferably the current sensor of the three current sensors having the highest temperature (the current sensors generally will have similar temperatures, but one current sensor may have a higher temperature than the temperatures of the other current sensors); and a plot 96 of the temperature of one of the switches 66 (i.e., IGBT temperature) of one of the switching units 64 of inverter 60 as recorded while eDrive unit test version 80 is being run, wherein the one of the switches 66 is preferably the switch of the six switches having the highest temperature. The plotted information further includes a plot 97 of the electrical current ("$I_{RMS}$") outputted from inverter 60 to motor 14 as recorded while eDrive unit test version 80 is being run.

Other information recorded while eDrive unit test version 80 is being run, and which may also be part of the plotted information of graphs 90 and 92, includes the temperature of DC link capacitor 62, the ambient temperature of the environment of the eDrive unit test version, the temperature of the stator coil of motor 14, the temperature of the coolant inlet and/or coolant outlets associated with power electronics module 26, and the like.

The plotted information of graphs 90 and/or 92 represents a thermal model of current sensor 70 of eDrive unit test version 80. As eDrive unit test version 80 is the same type of eDrive unit as the eDrive unit of the electric drive system of EV 12, the current sensor thermal model is representative of inverter 60 of the EV.

Accordingly, controller 63 predicts the temperature of current sensor 70 of inverter 60 of EV 12 by using (i) the measured temperature of a switch 66 (i.e., IGBT temperature) of inverter 60 of EV 12, (ii) the commanded current to be outputted from inverter 60 (i.e., $I^2_{RMS}$), and (iii) the values of the unknown parameters determined from the current sensor thermal model. In this way, controller 63 uses the current sensor thermal model and the known measured quantities, IGBT temperature ($T_{IGBT}$) and commanded current ($I^2_{RMS}$), to predict the temperature of a current sensor 70 of inverter 60 of EV 12. (As noted herein, the temperatures of current sensors 70 of inverter 60 of EV 12 are not directly measurable and thereby the temperature of current sensor 70 is "predicted".)

Figure 5:
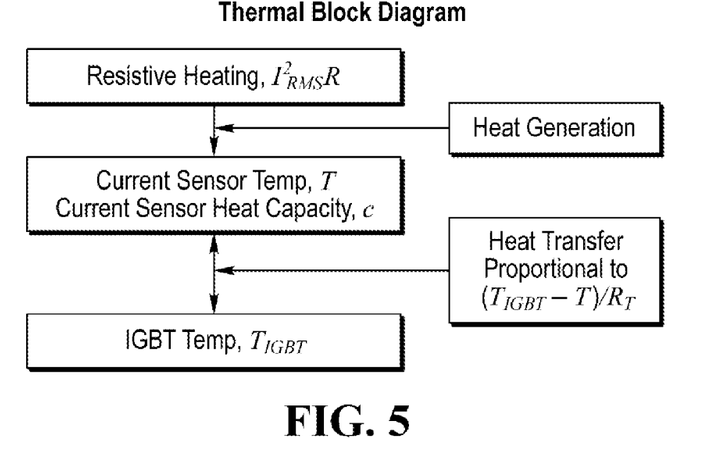
FIG. 5 illustrates a block diagram indicative of thermodynamics involving components of the inverter of the electric drive system during operation of the electric drive system.

The procedure for obtaining the parameter information based on the thermal model will now be described. For reference, FIG. 5 illustrates a block diagram indicative of thermodynamics involving components of inverter 60 of EV 12 during operation of the electric drive system of the EV.

The governing thermal equation for predicting the temperature of current sensor 70 from the IGBT temperature ($T_{IGBT}$) and the commanded current ($I^2_{RMS}$) is:

$$\dot{T}c = (T_{IGBT} - T)/R_T + I_{RMS}^2 R \quad (1)$$

Rearranging and grouping the variables provides the following thermal equation:

$$\dot{T} + \alpha T = \alpha(T_{IGBT} + I_{RMS}^2 RR_T) \quad (2)$$

The solution to the differential equation:

$$T(t) = T(0)e^{-\alpha t} + \alpha e^{-\alpha t} \int e^{\alpha t}(T_{IGBT}(t) + I_{RMS}^2(t) RR_T) dt \quad (3)$$

$R_T$ is thermal resistances with units [K/W], R is electrical resistance with units [V/A], c is thermal heat capacitance with units [W·s/K], and α is a thermal time constant with units [1/s]. The constant α and the constant $RR_T$ are unknown. (The constant $RR_T$ is the bulk constant.) The temperature T(0) is the temperature of current sensor 70 at key-on.

The individual parameters used in the derivation cannot be solved for independently in this context (and it is unnecessary to do so) but they can be lumped into two parameters (α and $RR_T$) that can be fit to the experimental data plotted in graphs 90 and 92. In this regard, the unknown constants α and $RR_T$ are fitted to the experimental data plotted in graphs 90 and 92. The unknown constants are fitted to the experimental data such as by use of a least square algorithm. For the particular hardware used to illustrate this example of the present invention (i.e., the experimental data plotted in graphs 90 and 92) the unknown constants were determined to be:

$$\alpha = 0.0011 \ [s^{-1}]$$

$$RR_T = 0.0013 \ [KA^{-2}] \quad (4)$$

The current sensor thermal model with fitted parameters α=0.0011[$s^{-1}$] and $RR_T$=0.0013[$KA^{-2}$] fits the experimental data ($R^2$~0.97-0.99) relatively well when the initial temperature, T(0), is known.

Figure 6:
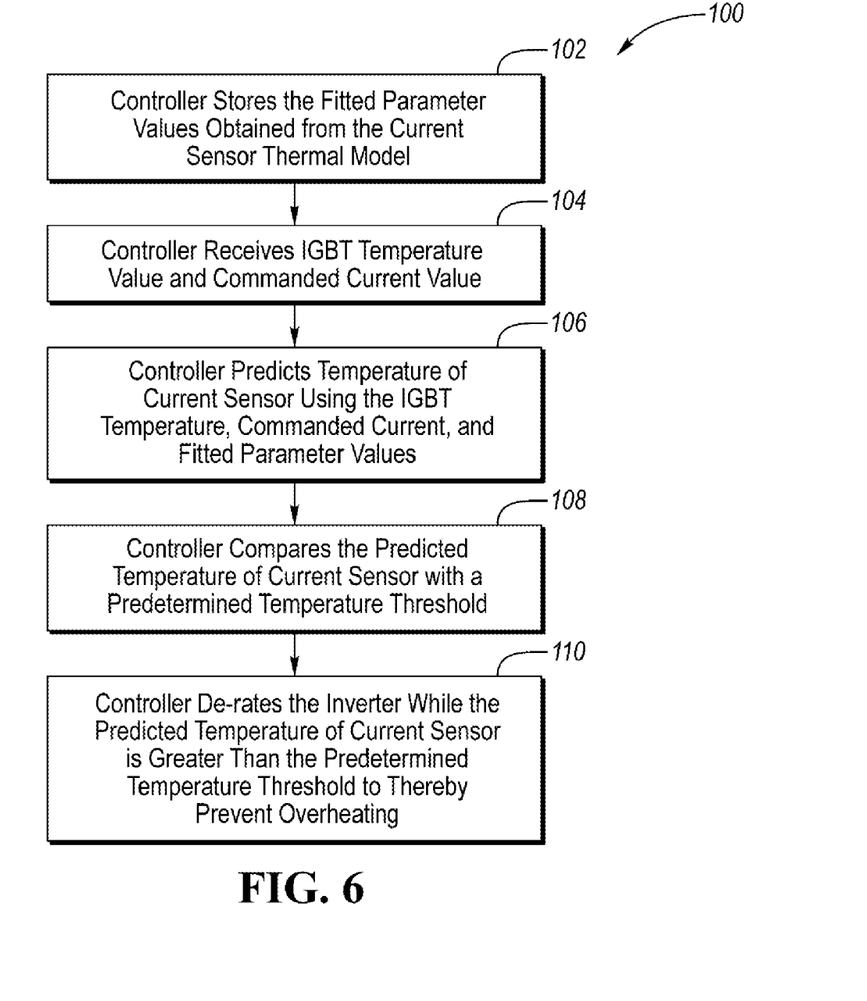
FIG. 6 is a flowchart depicting operation of a method and system for regulating the electric drive system according to a predicted temperature of a current sensor of the inverter to prevent overheating.

Referring now to FIG. 6, with continual reference to the preceding Figures, a flowchart 100 depicting operation of a method and a system for regulating the electric drive system of EV 12 according to a predicted temperature of current sensor 70 to prevent overheating of inverter 60 is shown. The operation includes controller 63 storing the values of fitted parameters α and $RR_T$ determined from the current sensor thermal model, as indicated in block 102. As discussed above, these fitted parameters α and $RR_T$ are parameters of a thermal equation for determining a temperature of current sensor 70. Other parameters of the thermal equation include the MGT temperature and the commanded current, which are known measured quantities.

While the electric drive system of EV 12 is in use, the operation further includes controller 63 receiving a signal indicative of a temperature of a switch 66 (i.e., the IGBT temperature ($T_{IGBT}$)) of a switching unit 64 of inverter 60 and a signal indicative of a commanded current ($I^2_{RMS}$) to be outputted by inverter 60 to motor 14, as indicated in block 104. Controller 63 receives the signal indicative of the IGBT temperature ($T_{IGBT}$) from a temperature sensor directly measuring the temperature of the switch. Controller 63 may receive the signal indicative of the commanded current ($I^2_{RMS}$) from system controller 48. System controller 48 provides the signal indicative of the commanded current ($I^2_{RMS}$) to controller 63 for the controller to control inverter 60 in an appropriate manner for the inverter to output an output power to motor 14 commensurate with the commanded current ($I^2_{RMS}$).

The operation further includes controller 63 predicting a temperature (T(t)) of a current sensor 70 of inverter 60 while the electric drive system operates over time by using (i) the IGBT temperature ($T_{IGBT}$), (ii) the commanded current ($I^2_{RMS}$), and (iii) the values of fitted parameters α and $RR_T$ determined from the current sensor thermal model, as indicated in block 106. Particularly, controller 63 solves the differential equation (equation (3) above) using the IGBT temperature ($T_{IGBT}$) value, the commanded current ($I^2_{RMS}$) value, and the values of the fitted parameters to predict the temperature of current sensor 70. In this regard, controller 63 implements a discrete version of a solution of the differential equation according to the following equations:

$$g_{j-1} = T_{IGBT}(t_{j-1}) + I_{RMS}^2(t_{j-1})RR_T \quad (5)$$

$$g_j = T_{IGBT}(t_j) + I_{RMS}^2(t_j)RR_T$$

$$\Delta g = g_j - g_{j-1}$$

$$\Delta t = t_j - t_{j-1}$$

$$T(t_j) = T(t_{j-1})e^{-\alpha \Delta t} + g_{j-1}(1 - e^{-\alpha \Delta t}) + \frac{\Delta g}{\alpha \Delta t}(e^{-\alpha \Delta t} + \alpha \Delta t - 1)$$

$t_j$ is the present time that the temperature (T) of current sensor 70 is calculated and $t_{j-1}$ is the previous time that the temperature (T) of the current sensor was calculated. If no previous temperature history exists (e.g., first key-on event), then use $t_j=T_{j-1}$=now( ) and $T(t_j)=T_{IGBT(tj)}$. In a preferred embodiment, the discrete solution (equations (5)) makes use of trapezoidal integration to solve the general differential thermal equation (equation (3)). This embodiment is not meant to be limiting as other discrete solutions are possible.

The operation further includes controller 63 comparing the predicted temperature of current sensor 70 with a predetermined temperature threshold, as indicated in block 108. Controller 63 de-rates inverter 60 while the predicted temperature of current sensor 70 is greater than the predetermined temperature threshold to thereby prevent overheating of the inverter components, as indicated in block 110. For example, controller 63 "de-rates" inverter 60 by reducing the input power received by the inverter from battery 24, turning off inverter 60 for a period of time, etc.

Of course, system controller 48 may be operable to perform any of these steps upon receiving from controller 63 a signal indicative of the predicted temperature of current sensor 70. As such, system controller 48 may de-rate inverter 60 and/or other components of the electric drive system while the predicted temperature of current sensor 70 is greater than the predetermined temperature threshold.

As described, the temperature of current sensors 70 of inverter 60 can be modeled based on information already known to EV 12, namely the IGBT temperature and the commanded RMS current. The current sensor thermal model may potentially replace time-based limits on RMS current that have been used to protect inverter components, thereby maintaining protection of the current sensors without unnecessarily compromising eDrive capability.

Further, regarding the temperature of DC link capacitor 62, it is likely the case that the temperature of current sensor 70 will be greater than the temperature of the DC link capacitor. The temperature of DC link capacitor 62 also depends on certain factors which do not affect the temperature of current sensor 70. As such, given both components have the same/similar temperature operating limits, monitoring the predicted temperature of current sensor 70 is sufficient for controlling the operation of the electric drive system to prevent overheating.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric drive system, comprising:
an inverter having a switch and a current sensor; and
a controller configured to reduce power output of the inverter while a temperature of the current sensor, predicted from a thermal equation given a sensed temperature of the switch, a sensed current output from the inverter, and values of parameters of the thermal equation obtained from a thermal model of the current sensor, being greater than a threshold.

2. The electric drive system of claim 1 wherein:
the thermal model of the current sensor is derived from a test version of the inverter being tested under a plurality of drive cycles in which for each drive cycle a set of information is recorded including a sensed temperature of a switch of the test version of the inverter, a sensed current output from the test version of the inverter, and a sensed temperature of a current sensor of the test version of the inverter.

3. The electric drive system of claim 2 wherein:
the parameter values are obtained from the thermal model of the current sensor by finding which values of switch temperature, current output, and the parameters of the thermal equation fit the set of information recorded for at least one of the drive cycles.

4. The electric drive system of claim 1 wherein:
the controller is further configured to control the switch to cause the current output from the inverter to be commensurate with a commanded current.

5. The electric drive system of claim 4 further comprising:
a battery;
a motor; and
the inverter is configured to convert an input electrical power from the battery into an output electrical power based on the commanded current and provide the output electrical power to the motor.

6. The electric drive system of claim 5 further comprising:
a DC link capacitor, the DC link capacitor being disposed between the battery and the inverter; and
wherein the controller is further configured to de-rate operation of the DC link capacitor to reduce power output of the inverter.

7. The electric drive system of claim 1 wherein:
the electric drive system is of an electric vehicle and further includes a traction battery and a motor, wherein the inverter is configured to convert an input electrical power from the traction battery into an output electrical power and provide the output electrical power to the motor for propelling the electric vehicle.

8. The electric drive system of claim 1 wherein:
the current output from the inverter is sensed using the current sensor.

9. The electric drive system of claim 1 wherein:
the inverter includes a plurality of switches and a plurality of current sensors.

10. The electric drive system of claim 1 wherein:
the switch is an insulated gate bipolar transistor (IGBT).

11. An electric vehicle comprising:
an electric drive system including a traction battery, an inverter having a switch and a current sensor, and a motor, the inverter configured to convert an input electrical power from the traction battery into an output electrical power and provide the output electrical power to the motor for propelling the electric vehicle;
a controller configured to predict a temperature of the current sensor using a thermal equation which outputs the predicted temperature given a sensed temperature of the switch, a sensed current of the output electrical power from the inverter to the motor, and values of parameters of the thermal equation obtained from a thermal model of the current sensor; and the controller is further configured to de-rate the electric drive system while the predicted temperature is greater than a temperature threshold to prevent overheating.

12. The electric vehicle of claim 11 wherein:

the thermal model of the current sensor is derived from a test version of the inverter being tested under a plurality of drive cycles in which for each drive cycle a set of information is recorded including a sensed temperature of a switch of the test version of the inverter, a sensed current of an output electrical power from the test version of the inverter, and a sensed temperature of a current sensor of the test version of the inverter.

13. The electric vehicle of claim 12 wherein:

the parameter values are obtained from the thermal model of the current sensor by being values of switch temperature, current output, and the parameters of the thermal equation fit the set of information recorded for at least one of the drive cycles.

14. The electric vehicle of claim 11 wherein:

the current of the output electrical power from the inverter is sensed using the current sensor.

15. A method for an electric drive system including an inverter having a switch and a current sensor, the method comprising:

sensing a temperature of the switch;

sensing, using the current sensor, a current output from the inverter; and reducing power output of the inverter while a temperature of the current sensor, predicted from a thermal equation given the sensed temperature of the switch, the sensed current output from the inverter, and values of parameters of the thermal equation obtained from a thermal model of the current sensor, being greater than a threshold to maintain inverter temperature lower than the threshold.

16. The method of claim 15 further comprising:

deriving the thermal model of the current sensor from a test version of the inverter being tested under a plurality of drive cycles in which for each drive cycle a set of information is recorded including a sensed temperature of a switch of the test version of the inverter, a sensed current output from the test version of the inverter, and a sensed temperature of a current sensor of the test version of the inverter.

17. The method of claim 16 wherein:

obtaining the parameter values from the thermal model of the current sensor includes finding which values of switch temperature, current output, and the parameters of the thermal equation fit the set of information recorded for at least one of the drive cycles.

18. The method of claim 15 wherein the electric drive system further includes a traction battery and a motor, and the electric drive system is of electric vehicle, the method further comprising: converting, by the inverter, an input electrical power from the traction battery into an output electrical power and providing, from the inverter, the output electrical power to the motor for propelling the electric vehicle.

* * * * *